United States Patent [19]

Arnold et al.

[11] 4,045,770

[45] Aug. 30, 1977

[54] METHOD AND APPARATUS FOR ADJUSTING THE VELOCITY OF INK DROPS IN AN INK JET PRINTER

[75] Inventors: Robert Walker Arnold, Glen Aubrey; Thomas Tomasky, Endicott, both of N.Y.

[73] Assignee: International Business Machines Corporation, Armonk, N.Y.

[21] Appl. No.: 740,703

[22] Filed: Nov. 11, 1976

[51] Int. Cl.² .......................................... G01D 15/18
[52] U.S. Cl. ................................ 346/75; 346/140 R
[58] Field of Search ............................ 346/75, 140 R

[56] References Cited

U.S. PATENT DOCUMENTS 3,787,882  1/1974  Fillmore et al. ..................... 346/75
3,907,429  9/1975  Kuhn et al. ....................... 346/75 X Primary Examiner—George H. Miller, Jr.
Attorney, Agent, or Firm—John S. Gasper

[57] ABSTRACT

A servo system for adjusting the velocity of ink drops in a magnetic ink jet printer has a coarse control loop for making coarse increment adjustments to the pump which supplies ink under pressure to a nozzle and a fine control loop for making fine increment adjustments to the pressure of said pump. The velocity of the drops is determined by a pair of drop sensors located one drop wavelength apart at a fixed distance from the drop generation point. The direction of any phase error between pairs of drops is used to generate direction control signals applied to the coarse control loop until a reversal in phase error occurs. A toggle control allows the coarse control loop to make coarse adjustments in pump pressure around a null point velocity before switching direction control signals to the fine control loop.

12 Claims, 4 Drawing Figures

METHOD AND APPARATUS FOR ADJUSTING THE VELOCITY OF INK DROPS IN AN INK JET PRINTER

CROSS-REFERENCE TO RELATED APPLICATIONS

Application of D. F. Jensen, J. C. Tamulis, T. Tomasky and J. L. Zable, for a Method and Apparatus for Controlling the Velocity of Ink Drops in an Ink Jet Printer, Ser. No. 740,702, filed concurrently herewith.

BACKGROUND OF THE INVENTION

1. Field of the Invention

This invention relates to ink jet printing and particularly to a method and apparatus for controlling the velocity of ink drops in an ink jet printer.

2. Description of the Prior Art

In ink jet printers of one well-known type, drops of a field-controllable ink are formed and propelled from a nozzle toward a print medium. Ink is supplied to the nozzle under pressure sufficient to cause the ink to issue from the nozzle as a continuous stream. A drop generator such as a piezoelectric or magnetostrictive vibrator attached to the nozzle or other means located adjacent the continuous portion of the stream generates perturbations in the stream to cause it to break into individual drops of substantially uniform size and spacing. Field control devices located in the vicinity of the stream are regulated in accordance with the data signals to cause individual drops to be dispersed onto the print medium in the form of the desired data pattern. To insure proper placement of the drops it is important that the velocity of the drops be maintained as constant as possible.

The need for maintaining the velocity of the ink drops substantially constant to insure good print quality is well-recognized in the art. A discussion of prior art is contained in the above-mentioned cross-reference related application. In the related application an invention is described and claimed which is directed to a method for making a coarse correction in the velocity of the ink drops when a gross velocity error exists. The invention of the related application basically utilizes a change in the drop generation frequency to detect presence of a gross velocity error and then making a coarse correction followed by generating drops at the printing frequency and making a fine velocity correction in the event a further velocity error exists. In certain applications of ink jet printers it may not be practical to alter the drop generation frequency to determine if a gross velocity error exists. The present invention is directed to a method for making velocity corrections where a gross velocity error can exist but which does not require a change in the drop generation frequency.

SUMMARY OF THE INVENTION

It is a general object of this invention to provide an improved ink jet printer.

It is a further object of this invention to provide an improved method and apparatus for controlling the velocity of ink drops in an ink jet printer.

It is a further object of this invention to provide an improved method and apparatus for an ink jet printer, which is capable of correcting relatively large errors in the velocity of ink drops.

It is a more specific object of this invention to achieve the preceding objects without requiring changes in the frequency of drop generation.

It is a still further object of this invention to achieve the preceding objects with a minimum of operating steps and control means.

Broadly, the above, as well as other objects, are achieved in accordance with this invention be determining the direction of a velocity error in the jet stream and then making a succession of coarse incremental corrections to the pump pressure until a change in the direction of the velocity error is detected. Thereafter, a fine correction operation is performed in the direction opposite to the direction of the initial correction to achieve an adjustment of the jet stream velocity to the desired level. In the preferred embodiment, the correction scheme uses toggling about a null point with a plurality of directional changes using a succession of coarse corrections in opposite directions before switching to the fine velocity correction. The system is then switched to correction with one or more fine increments.

In this manner it is possible to correct for gross velocity errors in an ink jet stream with a minimum of operations and in a relatively short period of time with a relatively simple control at a single desired drop generating frequency.

The foregoing and other objects, features and advantages of the invention will be apparent from the following more particular description of a preferred embodiment of the invention, as illustrated in the accompanying drawing.

DETAILED DESCRIPTION OF THE INVENTION

Figure 1:
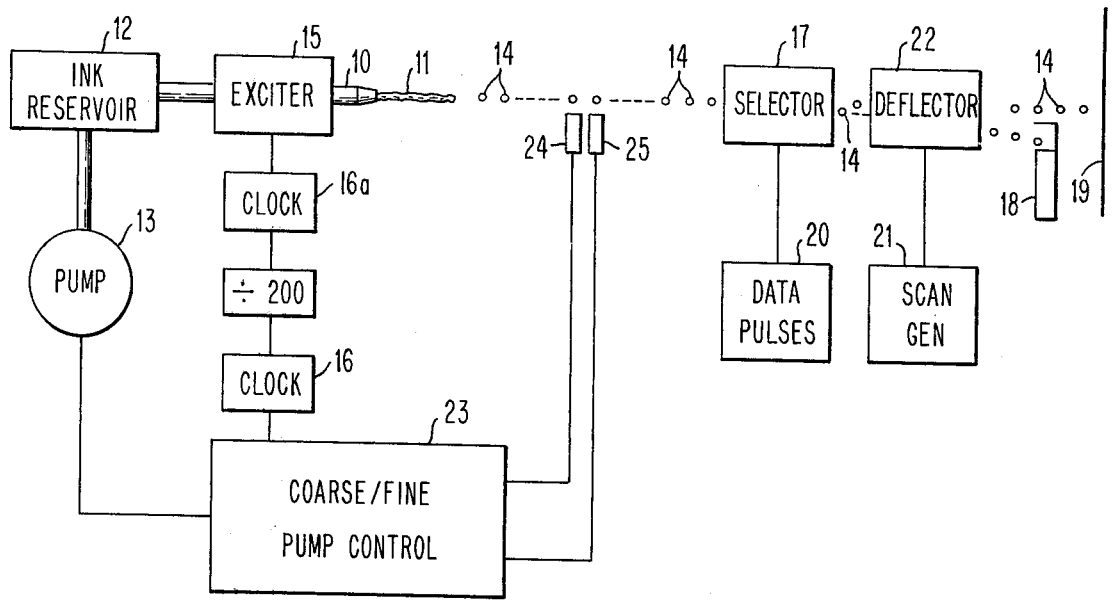
FIG. 1 is a schematic diagram of an ink jet printer with associated controls used to regulate the velocity of ink drops in accordance with this invention.

As seen in FIG. 1, a magnetic ink jet printer system comprises a nozzle 10 through which a stream of field controllable ink 11 such as a ferromagnetic ink is ejected under pressure from a pump 13 connected to an ink reservoir 12. Drops 14 are formed in the ink stream by an excitor 15 which may be a magnetostrictive element connected to the nozzle causing it to vibrate at a predetermined frequency established by clock 16a to produce perturbations in the ink stream whereby drops are caused to be formed at a fixed point in the trajectory of the stream as the drops move toward a print medium 19. Drops not used for printing are deflected from the initial stream trajectory by a magnetic selector 17 into a gutter 18 located in advance of the print medium 19. A data pulse source 20 applies a pattern of electric pulses to magnetic selector 17 in timed relation with the flight of the ink drops 14. A raster scan signal is applied by raster scan generator 21 to a magnetic deflector 22, which causes the ink drops to be dispersed in an orthogonal direction to become deposited onto paper 19 in a data pattern. The printer system thus far described is well-known in the art. Further details of construction and operation of such a system may be more fully understood by reference to U.S. Pat. No. 3,959,797, issued May 25, 1976, to D. F. Jensen. Magnetostrictive devices and their method of operation are also well-known in the art for generating drops. One such device is described in a publication of C. P. Eller et al. in the IBM Technical Disclosure Bulletin for Sept. 1976, Vol. 19, No. 4, at pages 1201 and 1202.

As previously described, the velocity of the ink drops 14 as they move toward print medium 19 is controlled by regulating the pump 13, utilizing a coarse/fine pump control 23 operated by timing pulses from clocks 16 and 16a, as well as velocity detection pulses generated by drop detectors 24 and 25, which are located in proximity to the trajectory of ink drops 14 at a fixed position in advance of drop selector 17.

Various types of ink drop detectors may be utilized. A preferred form of drop detector is described in the publication of G. F. Fan, published in the IBM Technical Disclosure Bulletin, Vol. 16, No. 3, August 1973, at page 880. As described in that publication, the detectors 24 and 25 are optical drop sensors which utilize an optical fiber for projecting separate light beams across the jet stream toward light sensitive semiconductor elements on the opposite side of the drop stream. The light beams of the drop detectors 24 and 25 are interrupted by the presence of an ink drop causing an electrical signal to be generated by each of the semiconductor devices to the coarse/fine pump control 23. Further details of the operation of the drop detectors may be obtained by reference to the Fan publication.

In the preferred embodiment of this invention, the direction of a velocity error is determined by measuring the phase between adjacent drops 14. This is achieved by spacing the drop detectors 24 and 25 a distance corresponding to one drop wavelength, when the stream is at the ideal velocity and printing frequency of drop generation by clock 16a and by locating the drop detectors 24 and 25 at a known distance from the point of drop formation and from the selector 17. For example, if drop detector 24 is located a distance of 10 drop wavelengths from the drop formation point and drop detector 25 is located 10 drop wavelengths from selector 17, the position of a drop relative to selector 17 is known within 1.0 percent. If a phase error greater than 0.5 percent is noted between detectors 24 and 25, then velocity can be adjusted in the proper direction to bring the spacing between drops 14 to the correct value. For example, if a 10 percent velocity error exists over a distance of 10 wavelengths, the drop count would be greater or lesser by one full drop. An extra drop would correspond to a full 360° in phase and would not detect it and the system would be locked on a drop count which is off by 10 percent. When detectors 24 and 25 are spaced one wavelength, and the velocity decreases as much as 50 percent, there are 3 drops in the distance of one drop wavelength. The method of detecting a phase variance or velocity error of this magnitude is to vary the stream velocity in 2 sensing cycles. The first cycle is to sense the variance and make coarse adjustments in the velocity so as to get a variance of less than 10 percent of the desired value followed by making one or more fine adjustments to obtaining the 1 percent accuracy at the selector. As previously discussed, the method of this invention involves the performance of a succession of incremental coarse adjustments in a first direction until a change in direction of phase is detected and then performing one or more coarse adjustments to toggle about a null velocity point before switching to a fine adjust to make a final adjustment at the null point.

Figure 2:
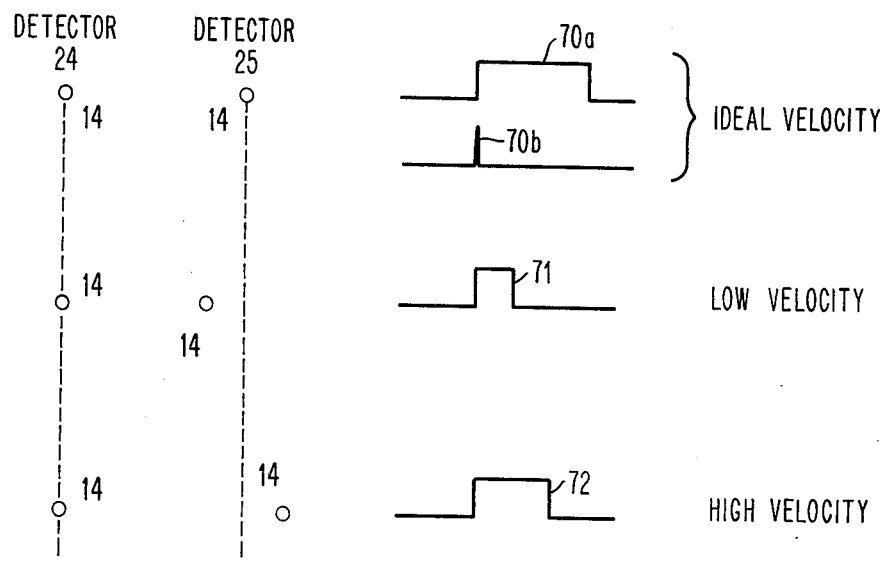
FIG. 2 illustrates waveforms used to perform velocity correction in accordance with this invention.
Figure 3:
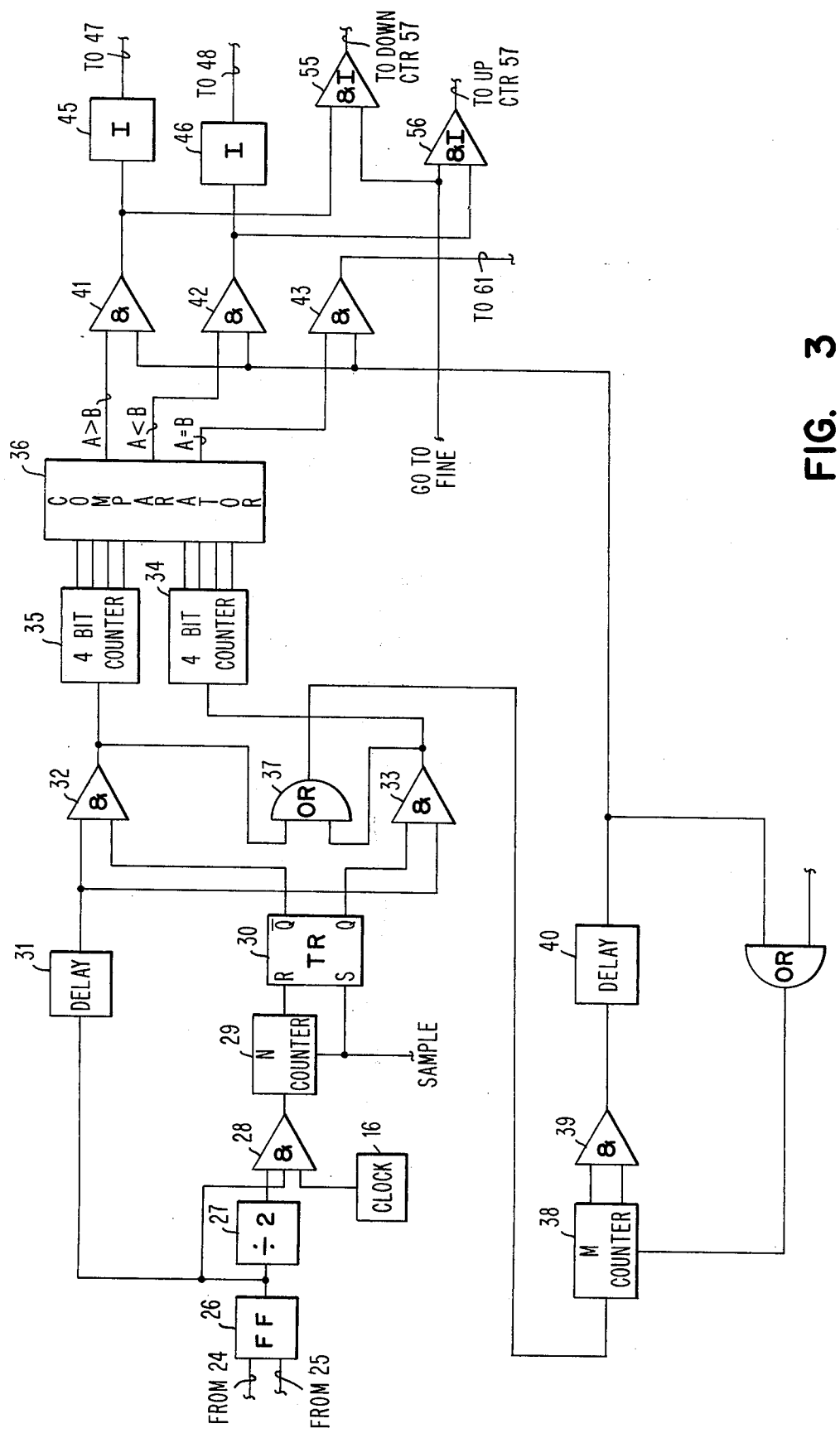
FIGS. 3 and 4 are a single schematic logic diagram illustrating and embodiment to a specific control arrangement for practicing the invention.
Figure 4:
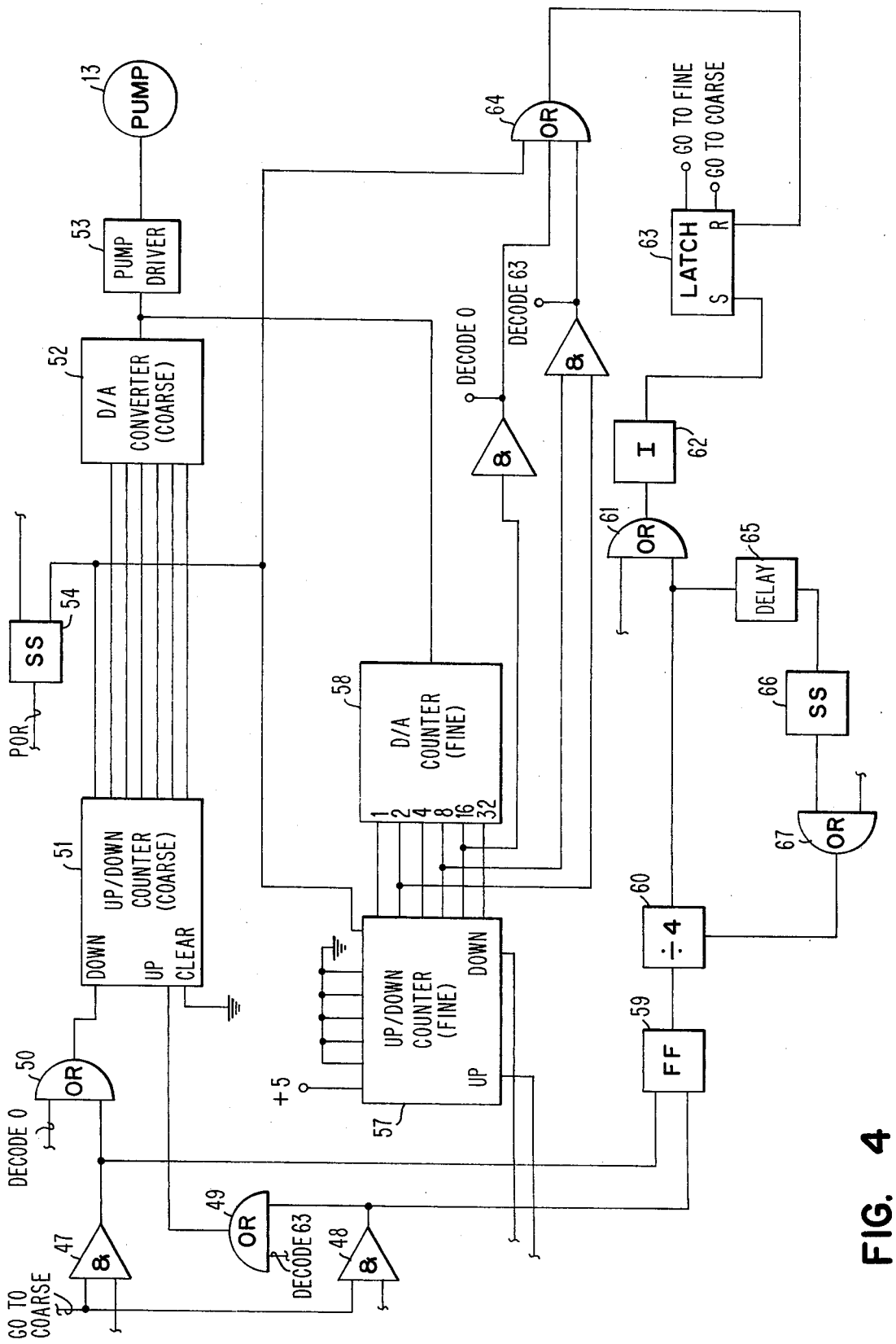

A preferred embodiment of a control system for accomplishing this is seen in FIG. 3, wherein a flip-flop 26 is driven by the electric pulses from drop detectors 24 and 25. Flip-flop 26 is set up so that detector 24 flips it plus and detector 25 flips it negative. Therefore, the output waveforms 70, 71 and 72 (see FIG. 2) from flip-flop 26 represent the phase indication of the ink drops 14 relative to the detectors 24 and 25. The waveforms 71 and 72 of FIG. 2 illustrate two types of phase errors which could exist for velocity errors of ± 25 percent (¼ λ) while waveform 70 shows no velocity error. In order to measure the phase error of the waveforms 70, 71 and 72 within the accuracy of 0.5 percent as previously described, it is necessary that the phase error time interval (W) be subdivided into one part out of 200, i.e. 1/200 = 0.005 = 0.5 percent. For a typical drop generation rate of 25 KHz applied to exciter 15 by clock 16a, derived by counting down from 5 MHz (clock 16), a 5 MHz pulse rate is applied by clock 16 through AND gate 28 to drive a phase error counter 29. Pulses from clock 16 are gated through AND circuit 28 to drive phase error counter 29 during the time interval (W) of the output pulse of flip-flop 26 and the time interval of every other output pulse of flip-flop 26 pass through the divide by 2 circuit 27. The divide by 2 circuit 27 is used to check the phase error of every other pair of drops. This is done to allow time for resetting the counters after each test sample. At the 5 MHz pulse rate, 200 counts of clock 16 corresponds to one wavelength of time. Therefore, ± 50 counts corresponds to ¼ wavelength which is the full count condition of counter 29. Therefore, if the phase error has a count less than 50 (waveform 71 or 70b of FIG. 2) then the drop separation is less than 1 wavelength and velocity must be increased. If the count in counter 29 equals 50, ($\phi$ error in 70a or 72) the velocity must be decreased since the separation between drops as determined by the time pulse of flip-flop 26 is greater than 1 wavelength. Note that counter 29 denotes the direction in which velocity must be changed. The magnitude of the correction is not determined, since pump 13 is non-linear. Pump 13 therefore is, in accordance with this arrangement, operated only in fixed coarse increments of adjustment in the desired direction opposite the direction of the error as signified by the count condition of counter 29.

When counter 29 reaches the nth count condition, trigger 30 is reset. The pulse from delay circuit 31 gates the output of trigger 30 to AND gates 32 and 33. If counter 29 is less than full N count, e.g. less than 50, trigger 30 is not reset, the Q output remains up and a phase error pulse is gated to 4-bit counter 34, indicating an error in the plus direction. This error indication is stored in comparator 36. If counter 29 at sample time has a full count, indicating an error in the minus direction, trigger 30 is switched causing the $\overline{Q}$ output to change from down to up and a phase error pulse is gated by pulse from delay circuit 31 through AND circuit 32 through the 4-bit counter 35 to be stored in comparator 36. The outputs of AND gates 34, 35 are also connected through OR gate 37 to a sample counter 38. At the end of a predetermined number of samples (e.g. 10) which provides a velocity error which over a substantial portion of the stream counter 38 initiates a readout pulse through AND circuit 39 and delay circuit 40, whose output is connected to AND gates 41, 42 and 43. The pulse from delay circuit 40 gates the velocity error direction information stored in comparator 36 to coarse or fine correction loops. The coarse correction loop comprises up/down coarse counter 51 and D/A converter 52. The fine correction loop comprises up/down fine counter 57 and D/A converter 58. A single shot 54 connected to an external source is used to preload a count condition in the coarse counter 51 and fine counter 57. The preloading count may, if desired, be set to a level which causes D/A converter 52 to operate the pump driver 53 to cause the pressure from pump 13 to adjust the velocity of the jet stream to a high velocity error condition to assure that no more than two drops exist between detectors 24 and 25.

For each count change of counter 51, D/A converter 52 operates to apply a coarse voltage increment adjustment to pump driver 53. For each count change of fine counter 57, D/A converter 58 applies a smaller or fine voltage increment adjustment to pump driver 53.

A first output of comparator 36 for indicating a high velocity condition (A>B) is connected through AND gate 41, inverter 45, coarse loop AND gate 47, and OR gate 50 to the DOWN side of coarse counter 51. The first output of comparator 36 is also connected through AND/INVERT gate 55 to the DOWN side of fine counter 57. A second output of comparator 36 for indicating a low velocity condition (A<B) is connected through AND gate 42, inverter 46, coarse loop AND gate 48, OR gate 49 to the UP side of coarse counter 51. The second output of comparator 36 is also connected to the fine loop control via AND/INVERT gate 56 to the UP side of fine counter 57.

A third output of comparator 36 for indicating no velocity error is connected through AND gate 43, OR gate 61, inverter 62 to the set terminal of latch 63 having outputs GO TO FINE and GO TO COARSE, respectively, which provide feedback pulses to connect the velocity error detection means to the coarse and fine loops, respectively.

As previously stated, the coarse loop is operated to apply one or more coarse increment, voltage adjustments through pump drive circuit 53 to pump 13 until a direction change in the velocity error is detected by phase counter 29, phase trigger 30 and comparator 36. A toggle control, which causes the coarse loop to toggle about a null velocity condition comprises a flip-flop 59 driven by pulses from AND gates 47 and 48, which apply direction pulses from the comparator 36 to up/-down coarse counter 51. Each time a reversal in the direction of the velocity error is detected by comparator 36 and applied to coarse counter 51, flip-flop 59 is operated to store a count in toggle counter 60. When toggle counter 60 reaches a full count condition indicating that the coarse velocity correction loop has toggled a plurality of times about a null condition, a signal is applied through OR gate 61, inverter 62, which sets latch 63 to change the output signal from GO TO COARSE to GO TO FINE. A feedback pulse is applied through delay circuit 65, single shot 66 and OR gate 67 to reset toggle counter 60. The GO TO FINE signal from latch 63 is applied to fine loop control through AND/INVERT circuits 55 and 56. When the GO TO FINE signal is generated, detector 25 is no longer used for fine control. The detector 24 located at the distance of 10 λ, for example, from the fixed break-off point, now stores velocity error correction signals in comparator 36 which are gated from AND gates 41 and 42 by a pulse from delay circuit 40 through AND/INVERT circuits 55 and 56 to cause fine counter 57 to be stepped up or down so as to operate D/A converter 58 to apply fine increments of voltage adjustment to the pump driver 53. If the fine counter 57 exceeds its range via a predetermined count level after a number of iterations of the sampling technique and adjustments to the pressure pump 13, a decode 0 or decode 63 signal is generated through AND gates 68 or 69 to reset latch 63 changing the velocity control back to coarse from fine. Thus, should any change occur in the velocity of the drop stream which exceeds a predetermined gross amount of error, the fine control loop detects this change and indicates to the velocity control system that a coarse error exists and shifts into the coarse correction mode. At this point in the cycle of operation a coarse correction operation takes place until the toggling action is obtained and the system reswitches to fine control, as previously discussed.

While the system has been described in terms of a specific percentage of error correction and a specific setting for the counters and specific distances for the spacing of the drop detectors relative to each other and to the drop point in selector, it should be readily apparent to persons skilled in the art that other parameters may be selected depending on the desired range of the system and the nature of the ink jet stream operating elements.

While the invention has been particularly shown and described with reference to a preferred embodiment thereof, it will be understood by those skilled in the art that various changes in form and details may be made therein without departing from the spirit and scope of the invention.

We claim:

1. In an ink jet printing apparatus, the combination comprising
    jet forming means for projecting a continuous stream of ink drops along a path toward a print medium,
    pump means connected to said jet stream forming means for supplying a liquid ink under pressure to said jet forming means,
    a method for controlling the velocity of said ink drops comprising
    determining the existence and direction of any velocity error in said ink drops,
    effecting one or more coarse adjustments in a first direction in the pressure of said pump until a change in the direction of any velocity error occurs,
    then effecting a predetermined number of consecutive coarse correction reversals in the pump pressure to produce toggling of any velocity error about a null point velocity condition,
    then effecting one or more fine adjustments in the pressure of said pump to said null point velocity condition after completion of said predetermined number of coarse correction reversals.

2. In an ink jet printing apparatus, the combination comprising
    jet forming means for projecting a continuous stream of ink drops along a path toward a print medium,
    pump means connected to said jet stream forming means for supplying a liquid ink under pressure to said jet forming means, and
    control means for adjusting the velocity of said ink drops including
    means for determining the direction of any velocity error in said stream,
    and means for correcting any velocity error determined by said error detection determining means including,
    means for making coarse incremental adjustments in said pump pressure in the sense opposite to said velocity error until a first reversal in the direction of said velocity error occurs, means for causing said coarse adjustment means to toggle about a null point velocity of said stream, and means operative after a predetermined number of toggling operations of said coarse adjustment means for making one or more incremental fine adjustments in said pump pressure whereby said velocity is set at substantially said null point.

3. In an ink jet printing apparatus, the combination in accordance with claim 1 in which, said means for determining the direction of any velocity error includes, means for producing phase signals representative of the phase between successive ink drops, means for converting said phase signals to direction control signals representing the direction of any velocity error, and said means for correcting any velocity error comprises, means responsive to said direction control signals for causing said coarse incremental adjustments to said pump pressure and said means for causing said coarse adjustment means to toggle about said null point comprises means responsive to a predetermined number of consecutive reversals in said direction control signals.

4. In an ink jet printing apparatus, the combination in accordance with claim 3 in which, said means for producing said phase signals includes a pair of drop sensors for detecting the position of individual ink drops in said stream, said drop sensors being separated along said stream a distance equal to one drop wavelength at said null point velocity, said drop sensors being operable for generating sense pulses upon the alignment of individual drops with said sensors, means for converting said sense pulses to a time variable pulse representing said phase between successive ink drops.

5. In an ink jet printing apparatus, the combination in accordance with claim 4 in which, said means for producing said phase signals further comprises, means for activating said pair of drop sensors for checking the phase error of every other pair of consecutive ink drops.

6. In an ink jet printing apparatus, the combination in accordance with claim 5 in which said means for determining the direction of any error in the pahse of said drops further comprises means for measuring the width of said time variable phase pulse, and means for generating a direction signal resulting from said meansurement of said phase pulse.

7. In an ink jet printing apparatus in accordance with claim 6 in which said means for measuring the width of said phase pulse further comprises timing means operable for generating a stream of timed pulses at a frequency proportional to the time interval of said time variable phase pulse at said null velocity counter means having a predetermined full count condition corresponding to a velocity error, means operable for gating pulses from said timing means to said counter during the time duration of said phase pulse, and means for producing a direction control signal dependent on the count condition of said counter means at the end of said phase pulse.

8. In an ink jet printing apparatus, the combination in accordance with claim 7, in which said means for generating said direction control signals further comprises, means for storing plural count condition signals from said counter means corresponding to plural samples of pairs of ink drops, means for making a comparison of said count condition signals and generating a direction control signal representing the result of said comparison.

9. In an ink jet printing apparatus, the combination in accordance with claim 7, in which said means for making coarse increment adjustments comprises a coarse control loop connected to receive said direction control signals, said means for making fine increment adjustments comprises a fine control loop connected to receive said direction control signals, and said toggle means comprises control means for gating direction control signals from said coarse loop to said fine loop.

10. In an ink jet printing apparatus, the combination in accordance with claim 9, in which said coarse control loop further comprises a coarse control counter means operable by said direction control signals, and means for converting the count condition of said coarse control counter means to a coarse increment adjustment signal for operating said pump.

11. In an ink jet printing apparatus, the combination in accordance with claim 10, in which said coarse control counter means is an up/down digital counter operable by said direction control signal, and said converting means is a digital-to-analog converter means operable for converting the count condition of said digital counter to up/down coarse increment adjustment signals.

12. In an ink jet printing apparatus, the combination in accordance with claim 10, in which said coarse control loop further comprises means connected for selectively loading said coarse control counter means to a predetermined high velocity error count condition upon the beginning of a velocity adjustment test.

* * * * *